B. FORD.
STORAGE BATTERY PLATE.
APPLICATION FILED JULY 10, 1907.
921,391.
Patented May 11, 1909.
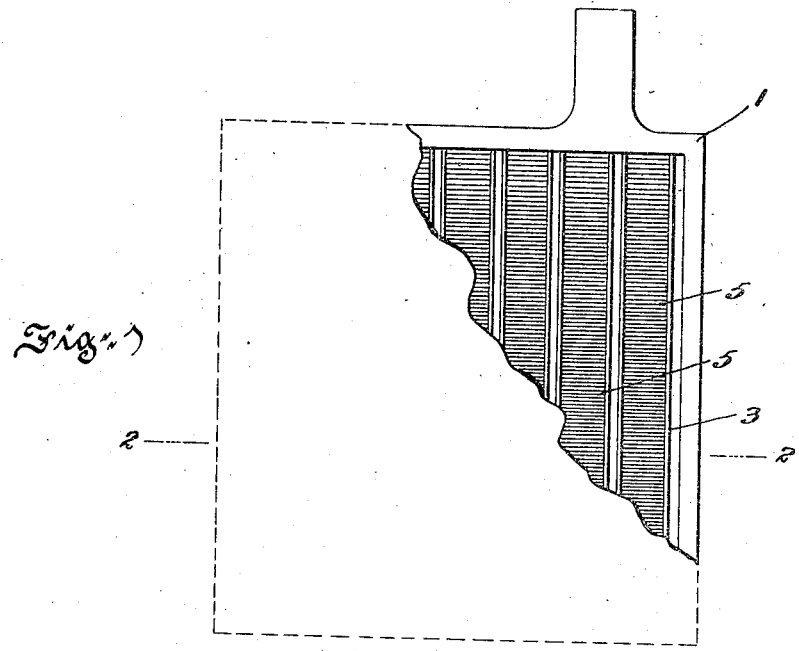
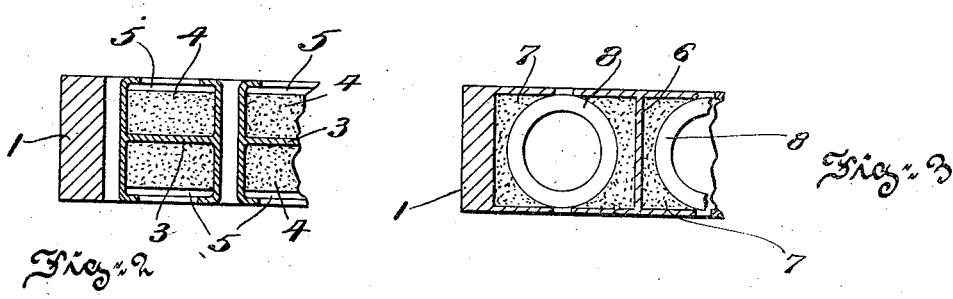
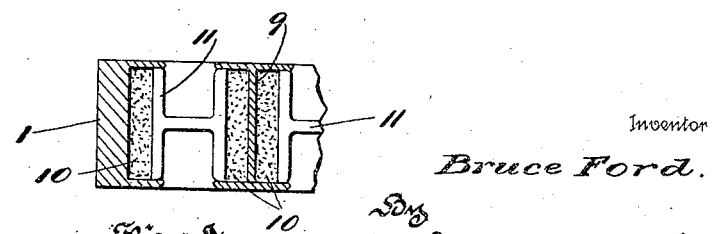
Witnesses
Inventor
Bruce Ford.
By
Augustus B Stoughton
Attorney

UNITED STATES PATENT OFFICE.

BRUCE FORD, OF PHILADELPHIA, PENNSYLVANIA.

STORAGE-BATTERY PLATE.

No. 921,391.     Specification of Letters Patent.     Patented May 11, 1909.

Application filed July 10, 1907. Serial No. 382,979.

*To all whom it may concern:*

Be it known that I, BRUCE FORD, a citizen of the United States, and resident of Philadelphia, in the county of Philadelphia and State of Pennsylvania, have invented a new and useful Storage-Battery Plate, of which the following is a specification.

Objects of the present invention are to obtain in a simple and comparatively inexpensive manner the advantages of a laminated wall or wall consisting of superposed thin plates for retaining the active material and affording access for the electrolyte thereto and to provide comparatively inexpensive and reliable means for holding such retaining walls to place.

In the accompanying drawings, Figure 1, is a side view of a storage battery plate embodying features of the invention. Fig. 2, is a sectional view taken on the line 2—2 of Fig. 1. Fig. 3, is a sectional view illustrating a modification of the invention, and Fig. 4, is a similar view illustrating another modification.

The plate comprises a suitable frame 1, containing a grid of conducting material.

Referring to Figs. 1 and 2, the bars 3, are of H-shape in cross section. On each side of the body of the arms there is active material or material to become active 4, and the ends of the arms are turned in so as to retain walls 5 consisting of piles of thin sheets or laminæ. The sheets may be of hard rubber and their thickness may be likened to that of paper.
They are piled one upon another and the electrolyte may circulate between them, but they efficiently retain the active material.

As shown in Fig. 3, the bars 6, of the grid are of H-shape, in cross-section, and active material or material to become active 7, is arranged on opposite sides of their body parts. The active material of adjacent bars is held to place by a laminated wall 8, consisting of washer-like rings or sheets piled one upon another. In this case the laminated walls are held to place by and between adjacent bars.

As shown in Fig. 4, the bars 9, are of I-shape in cross section and active material or material to become active 10, is placed upon each side of their bodies. The sheets that make up the laminated walls 11, are of H-shape in cross section and their arms abut upon the active material of adjacent bars and may be fitted in between the side flanges thereof. In this case the walls are held to place in substantially the same way as in the construction of Fig. 3. It is evident that in all the figures there is shown a grid having open faced receptacles into which the active material is placed and that the retaining walls of thin sheets are held in contact with the conducting walls of the receptacles.

What I claim is:

1. A storage battery plate comprising a conducting grid having open faced receptacles for active material or material to become active, active material or material to become active arranged in the receptacles, and laminated retaining walls consisting of piles of thin sheets covering the open faces and active material and clamped by the conducting walls of the receptacle, substantially as described.

2. A storage battery plate comprising a conducting grid having open faced receptacles for active material or material to become active, active material or material to become active arranged in the receptacles, and laminated retaining walls consisting of piles of thin sheets covering the open faces and active material and clamped by the conducting walls of the receptacle with their edges next to the active material, substantially as described.

3. A storage battery plate comprising a conducting grid having open faced receptacles for active material or material to become active, active material or material to become active arranged in the receptacles, and laminated retaining walls attached to the plate and consisting of piles of thin sheets covering the open faces and active material and clamped by the conducting walls of the receptacle with their edges next to the active material, substantially as described.

In testimony whereof I have hereunto signed my name.

BRUCE FORD.

Witnesses:
W. J. JACKSON,
FRANK E. FRENCH.